US012613918B2

(12) United States Patent (10) Patent No.: US 12,613,918 B2
Yim (45) Date of Patent: *Apr. 28, 2026

(54) DISPARATE SOURCING OF TREE DATA STRUCTURES FOR SEARCHING AND SUGGESTING APPLICATION SERVICES

(71) Applicant: GOOGLE LLC, Mountain View, CA (US)

(72) Inventor: Keun Soo Yim, San Jose, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/958,515

(22) Filed: Nov. 25, 2024

(65) Prior Publication Data

US 2025/0147780 A1 May 8, 2025

Related U.S. Application Data

(63) Continuation of application No. 18/387,401, filed on Nov. 6, 2023, now Pat. No. 12,153,941.

(51) Int. Cl.
*G06F 16/901* (2019.01)
*G06F 9/451* (2018.01)

(52) U.S. Cl.
CPC .......... *G06F 16/9027* (2019.01); *G06F 9/451* (2018.02)

(58) Field of Classification Search
None
See application file for complete search history.

(56) References Cited

U.S. PATENT DOCUMENTS

| 2006/0041661 A1 | 2/2006 | Erikson | |
| 2011/0191364 A1 | 8/2011 | LeBeau et al. | |
| 2015/0088844 A1 | 3/2015 | Stigsen | |
| 2015/0234645 A1* | 8/2015 | Ramachandran | ....... G06F 9/445 |
| | | | 707/766 |

(Continued)

OTHER PUBLICATIONS

"Google Assistant will soon add one tap shortcuts from your favorite apps" Retrieved from https://www.xda-developers.com/google-assistant-one-tap-shortcuts-third-party-apps, 5 pages, dated May 16, 2021.

(Continued)

*Primary Examiner* — Christopher J Raab
(74) *Attorney, Agent, or Firm* — Gray Ice Higdon

(57) ABSTRACT

Implementations set forth herein relate to providing suggestions for application services using tree data structures provided by various application sources. A native data structure, created by an assistant application or other related application, can be present in a local memory and, depending on the status of this native data structure, can be utilized to generate deep links to be rendered within the search interface. Selection of a particular deep link can initialize particular operations and/or routines at one or more client or remote applications. When the native structure is unavailable, or does not satisfy certain criteria, other actions can be initiated for fetching data from remote sources or utilizing other locally available application data structures. In some implementations, graphical user interface elements indicating operation statuses can be rendered based on the available data structure(s), thereby aiding in selecting certain services across multiple applications.

20 Claims, 6 Drawing Sheets

(56) References Cited

U.S. PATENT DOCUMENTS

| | | | |
|---|---|---|---|
| 2015/0242422 A1* | 8/2015 | Shapira | G06F 16/954 |
| | | | 707/722 |
| 2017/0124101 A1* | 5/2017 | Nigam | G06F 16/9535 |
| 2017/0171292 A1 | 6/2017 | Mark | |
| 2018/0276296 A1 | 9/2018 | Gerlach | |
| 2018/0300421 A1 | 10/2018 | Andreica | |
| 2019/0026294 A1* | 1/2019 | Nigam | G06F 16/9537 |
| 2020/0192652 A1* | 6/2020 | Worsnop | G06F 8/61 |
| 2021/0117174 A1 | 4/2021 | Worsnop et al. | |
| 2021/0191794 A1 | 6/2021 | Morkovine | |
| 2022/0083335 A1 | 3/2022 | Hiller | |

OTHER PUBLICATIONS

"Introducing Quick Search Box for Android" Developers. 5 pages, dated Sep. 17, 2009.

* cited by examiner

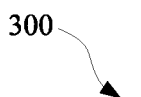

300

COMPUTING DEVICE
302

ASSISTANT INTERFACE
320

APPLICATIONS
334

APPLICATION DATA
330

DEVICE DATA
332

CONTEXTUAL DATA
336

AUTOMATED ASSISTANT
304

ASSISTANT DATA
338

INPUT PROCESSING ENGINE
306

SPEECH PROCESSING ENGINE
308

DATA PARSING ENGINE
310

PARAMETER ENGINE
312

DATA STRUCTURE GENERATION ENGINE
316

DATA STRUCTURE REQUEST ENGINE
318

OPERATION STATUS ENGINE
326

OUTPUT GENERATING ENGINE
314

TRAINING DATA ENGINE
324

ASSISTANT INVOCATION ENGINE
322

DISPARATE SOURCING OF TREE DATA STRUCTURES FOR SEARCHING AND SUGGESTING APPLICATION SERVICES

BACKGROUND

Humans may engage in human-to-computer dialogs with interactive software applications referred to herein as "automated assistants" (also referred to as "digital agents," "chatbots," "interactive personal assistants," "intelligent personal assistants," "assistant applications," "conversational agents," etc.). For example, humans (which when they interact with automated assistants may be referred to as "users") may provide commands and/or requests to an automated assistant using spoken natural language input (i.e., utterances), which may in some cases be converted into text and then processed, and/or by providing textual (e.g., typed) natural language input.

In some instances, automated assistants and/or other applications can be utilized to suggest certain applications for a user, and/or anticipate when a user may request a particular application to be launched. For example, an assistant application can be tasked with providing suggestions for applications for a user who has just caused a search field to surface at a display interface of their tablet computer or cellular phone. Although the assistant application can occasionally provide useful recommendations in such instances, more suitable recommendations may not be presented because of a lack of optimized resources available to the assistant application. For example, when a user initially causes an application search tool to surface, the search tool may be rendered with recently-viewed applications, without any consideration of specific utilities or services that the user may be interested in. As a result, the user may be required to tap a suggested application and then navigate through any interfaces of the suggested application to arrive at a destination that is most useful to the user. When considering how often this happens across all users and all devices, significant power and computational resources could be preserved by eliminating these intermediate user inputs for navigating through interfaces of a suggested application.

Furthermore, as the number of features of applications increases, the mere suggestion of an application trends towards being of little to no help to users. For example, some navigation applications provide users with the ability to view maps, navigate a route, order a ride, among many other features. Therefore, merely providing a shortcut to such a navigation application in an application search interface, without any other selectable features, may not actually provide much of a "shortcut" because the user would nonetheless be required to navigate to the desired feature in the navigation application. As a result, any buffering or other backend tasks to suggest the application would not actually preserve many resources considering the amount of time and resources the user may consume interacting with the selected application to arrive at a desired application interface.

SUMMARY

Implementations set forth herein relate to providing suggestions, for application services and/or other functions, in response to an express or inferred search inquiry that is processed using one or more available data tree structures. The data tree structures can be generated by a native application (e.g., assistant application, operating system, and/or other first party application), a third-party application, such as a client application that is providing the functions, and/or a remote server application programming interface (API). In some implementations, a data tree structure from a native application can be cached in a local memory (e.g., random-access memory) in furtherance of reducing latency when a user accesses an application search interface and/or selects an application shortcut to reveal suggested application services. The various applications that are subject to searching via the application search interface can also provide their own respective data tree structure for facilitating searching of their respective services. These application data structures can be cached in the local memory (e.g., RAM) or stored in a separate local memory device (e.g., ROM). However, when the application data structure is utilized in lieu of a native data structure (i.e., the tree data structure generated by the native application), there may or may not be some amount of added latency when the application data structure is not cached at the time that the user accesses the application search interface and/or selects an application shortcut.

In some implementations, when a tree data structure for searching application services is not cached in memory or otherwise stored at the client computing device, the native application (e.g., assistant application, application search application, etc.) can submit a request to a remote server API. The request can be submitted in furtherance of the client computing device determining that a native data structure and/or application data structure is not available or otherwise is not exhibiting a particular status (e.g., the data structure is no longer relevant, is out of date, etc.). In response to the server API receiving the request, the server API can provide a server data structure, which can be another tree data structure that facilitates searching of application services for one or more client applications. Although there may be greater latency exhibited when relying on the server data structure, the server data structure can nonetheless streamline identifying relevant application services for a user that is actively searching for such services.

As an example, a user can access an application search interface in furtherance of receiving directions to a particular location. The location can be, for example, a movie theater and the user can provide a few characters of a search query, such as "mov . . . " in furtherance of receiving suggestions for application services related to finding a movie theater nearby. In this example, the user may have a history of accessing their map application to find directions to nearby entertainment facilities, such as restaurants, zoos, and theme parks, and this history can be utilized by an assistant application to generate a tree data structure for searching application services. Therefore, when the application search interface receives the partial search query "mov" (the first 3 search characters of "movie theater directions"), the assistant application can use the native tree data structure, with nodes and/or various strings or characters, to determine historically relevant application services to suggest to the user. For example, a node in the native tree data structure can include the content "mov", and this node can reference a separate node with the content "movie theater". This separate node can correspond to an application deep link that, when executed, causes the map application to search the characters or phrase "movie theater" in a search field of the map application and render the results at the display interface of the computing device.

In some implementations, the assistant application can determine that a native data structure may not exhibit a status that is satisfactory for providing relevant search results (e.g., the native data structure may have expired or otherwise may have not been created within a threshold duration of time from the present). As a result, and despite potentially increasing latency at the search interface, the assistant application can determine whether any other application data structure is available for facilitating searching of application services. When one or more application data structures are available, and are optionally exhibiting a suitable status (e.g., a time since a time of creation has not reached an expiration threshold), the assistant application can cache the one or more application data structures in furtherance of assisting with searching application services. However, and in some implementations, when an application data structure is not available or otherwise expired, the assistant application can solicit a remote server API for a server tree data structure.

In some implementations, the server data structure can be generated by a remote API that is provided by an entity that provides any of the client applications available at the client computing device. Alternatively, or additionally, another remote API can be provided by another entity that provides the assistant application, and can generate data structures suitable for any particular user based on contextual data associated with the user (with prior permission from any associated user). When one or more server tree data structures are provided by one or more remote APIs, the assistant application can utilize the one or more server data structures to facilitate searching of relevant applications services at the applications search interface and/or application shortcut. For example, a server data structure can be provided by a remote API associated with a map application and, in response to receiving the "mov" characters at the application search interface, the server data structure can be utilized to facilitate identifying one or more relevant operations that can be performed by the map application. The one or more operations can include using a search field of the map application to search for "movie theaters" and launching a GUI that indicates, and/or audibly dictates, a sequence of steps to reach a nearby movie theater from a current location of the user. The application search interface can render a GUI element that indicates that these operations will be performed in response to the user selecting the GUI element at the application search interface.

Alternatively, or additionally, another server data structure (e.g., for a streaming application) can be received from a remote server API to facilitate searching of application services from a different application (e.g., the streaming application). This other server data structure can be utilized in combination with the "mov" search characters in furtherance of rendering a separate GUI element that, when selected, causes this different application to perform one or more other operations (e.g., search for movies to watch, and render a GUI with a selection of movies that the user may be interested in viewing based on relevant usage data). In this way, the user can be provided with deep links to relevant application services, which can reduce the amount of time that a user will spend navigating between application interfaces to arrive at an interface for initiating a desired application service. Furthermore, this can preserve resources that might otherwise be wasted when a user is required to initialize a default application interface of any client application before reaching the desired application interface that enables the user to benefit from a desired application service.

The above description is provided as an overview of some implementations of the present disclosure. Further description of those implementations, and other implementations, are described in more detail below.

Other implementations may include a non-transitory computer readable storage medium storing instructions executable by one or more processors (e.g., central processing unit(s) (CPU(s)), graphics processing unit(s) (GPU(s)), and/or tensor processing unit(s) (TPU(s)) to perform a method such as one or more of the methods described above and/or elsewhere herein. Yet other implementations may include a system of one or more computers that include one or more processors operable to execute stored instructions to perform a method such as one or more of the methods described above and/or elsewhere herein.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

BRIEF DESCRIPTION OF THE DRAWINGS

FIG. 3 illustrates a system for providing suggestions for application services and/or functions in response to a search inquiry that is processed using one or more available data tree structures.

DETAILED DESCRIPTION

Figure 1:
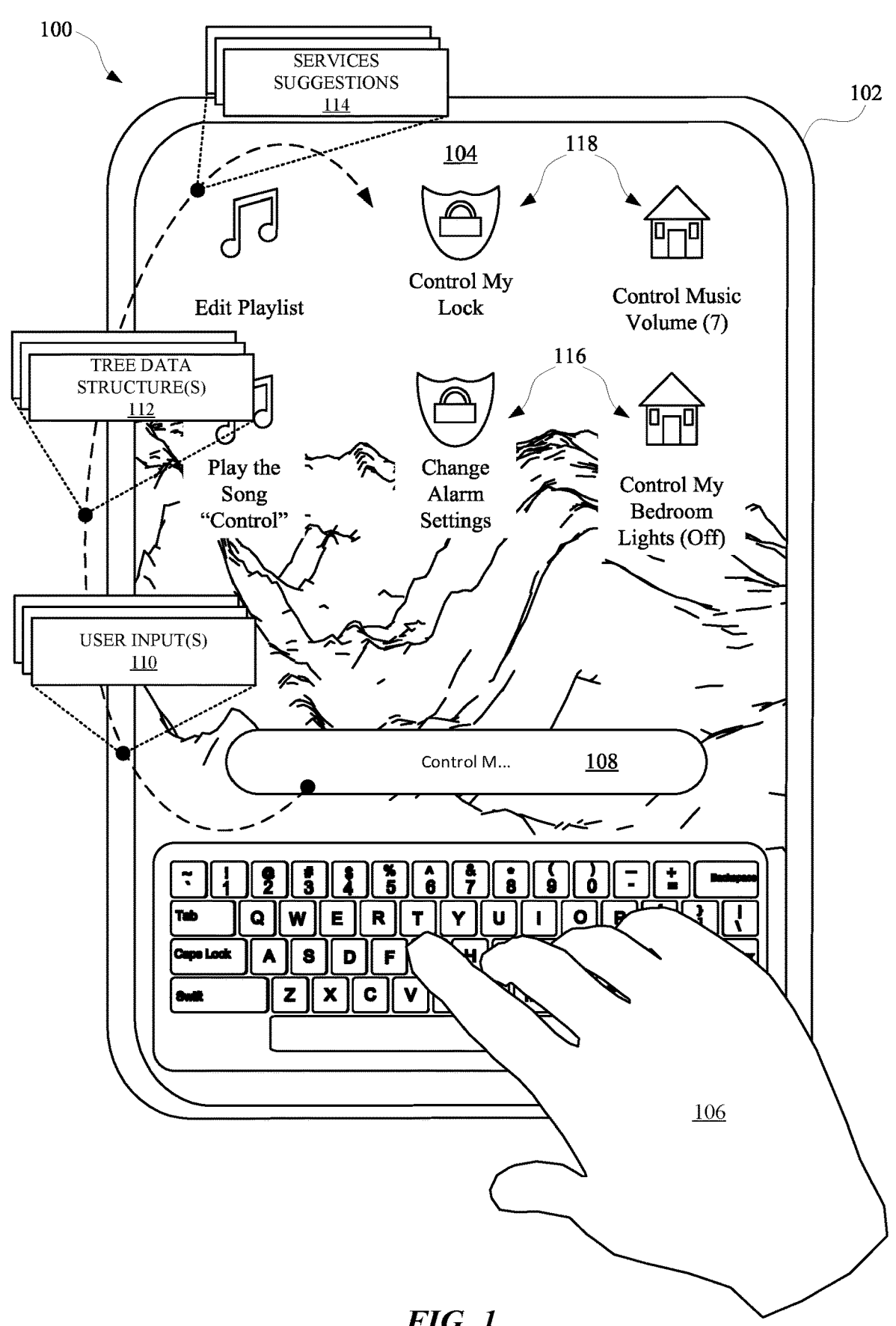
FIG. 1 illustrates a view of a computing device that utilizes tree data structures that are either cached, stored in other memory, or otherwise provided by another service for facilitating searching of various application services.

FIG. 1 illustrates a view 100 of a computing device 102 that utilizes tree-based data structures whether they are cached, stored in other memory, or otherwise provided by another service for facilitating searching of various application services. The computing device 102 can include a display interface 104 for rendering an application search interface 108, which can receive textual inputs from a user (e.g., via a touch input from a hand 106 of the user). When the user accesses the application search interface 108 and/or other GUI, an assistant application or other application of the computing device 102 can process user input(s) 110, such as express inputs and/or contextual data available to the computing device 102 with prior permission from the user. The user input(s) 110 can be processed with a tree data structure(s) 112 to generate services suggestions 114 that can be rendered at the display interface as particular selectable deep links 116.

For example, the tree data structure 112 can be generated by the assistant application to streamline the search for application services that are most relevant or useful to a user at the time that the user is accessing the application search interface 108. When the tree data structure 112 is generated by the assistant application within a threshold duration of time from the user accessing the application search interface 108, the tree data structure 112 can be considered as satisfying a threshold status. However, when the tree data structure 112 is not available in a local cache of the computing device 102 and/or otherwise does not exhibit the threshold status, the assistant application can determine whether another application has another version of the tree data structure 112 available (e.g., a tree data structure generated based on a recent interaction between the user and the other application). Optionally, when the assistant application does not have the tree data structure 112 available in cache, the assistant application can initiate a process for generated an updated tree data structure simultaneous to searching for another version of the tree data structure 112. When another application has the version of the tree data structure available, and this version satisfies the threshold status, this version of the tree data structure 112 can be processed with the user input 110 to generate other deep links and/or application service suggestions.

However, when another application (e.g., an application that is from a third party, relative to an entity that provides the assistant application) does not have the tree data structure 112 readily available (e.g., stored in ROM of the computing device 102), the assistant application can solicit a separate application service for a version of the tree data structure 112. For example, the assistant application and/or another application can submit a request to a remote server API for receiving another version of the tree data structure. In some implementations, while the remote server API is processing the request, the assistant application can provide application service suggestions that are based on a tree data structure that is available but may not exhibit the threshold status. For example, the initial selectable deep links 116 that are rendered in response to the user accessing the application search interface 108 and/or providing the user input 110 (e.g., "Control M . . . ") can include a security application deep link and a home control deep link. In response to the user selecting the security application deep link, the security application can perform one or more operations in furtherance of changing "alarm settings" (with prior permission from the user). When the remote server API and/or another application provides an updated tree data structure, additional selectable deep links 118 can be provided based on the user input 110 and anu updated tree data structure. For example, the additional selectable deep links can include another security application deep link and home control deep link.

Figure 2:
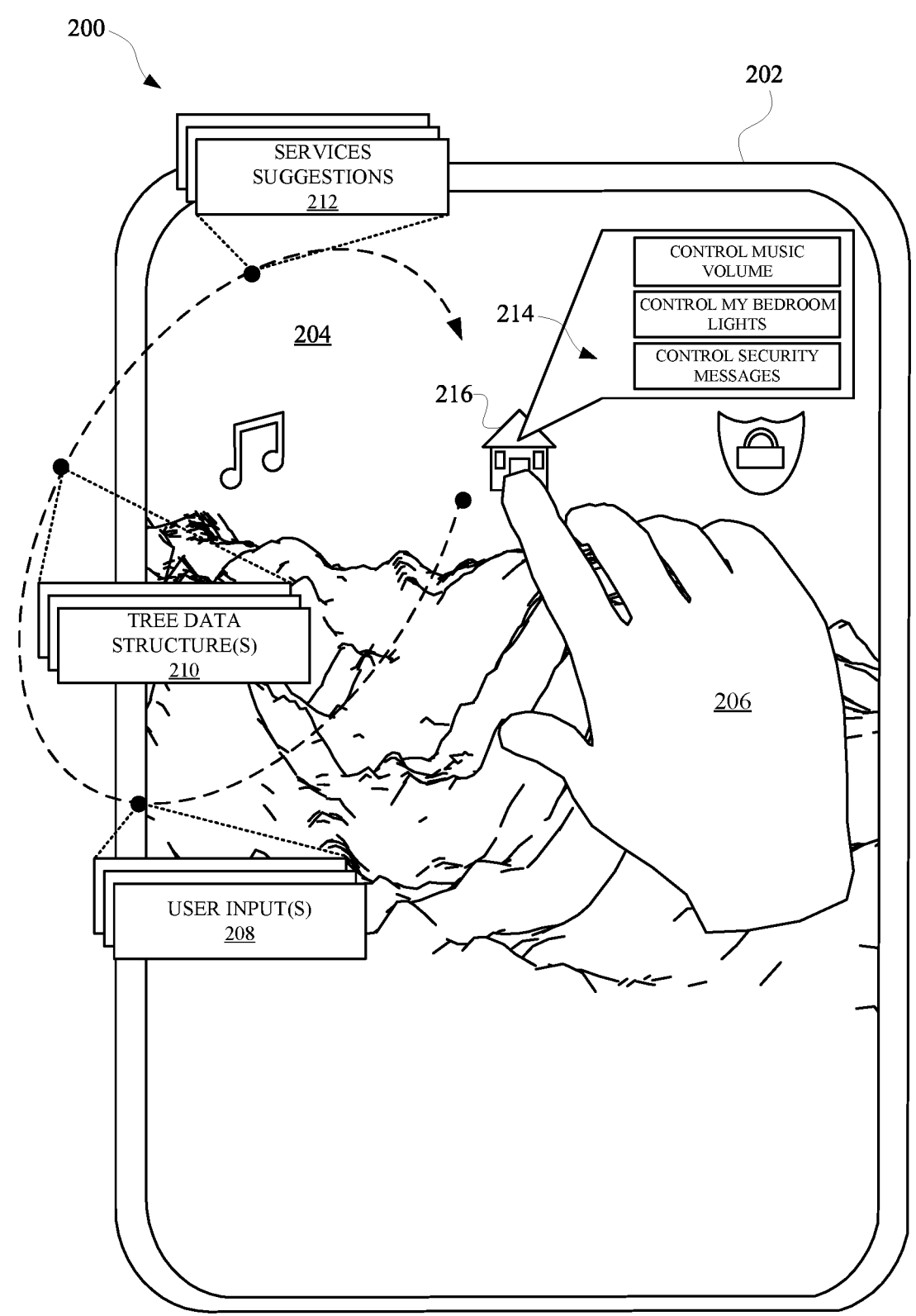
FIG. 2 illustrates a view of a computing device that utilizes tree data structures that are cached, stored in other memory, or otherwise provided by another service for facilitating application service suggestions.

FIG. 2 illustrates a view 200 a computing device 202 that utilizes tree data structures 210 that are cached, stored in other memory, or otherwise provided by another service for facilitating application service suggestions. FIG. 2 can be understood in view of the description of FIG. 1, except that FIG. 2 describes implementations with respect to selecting a particular application shortcut in furtherance of receiving application service suggestions for that particular application. For example, the user can tap (e.g., with their hand 206) or otherwise provide an input that indicates they are interested in accessing the application 216. In response, this user input 208 can be processed and an assistant application can determine whether a tree data structure 210 is cached (e.g., in RAM) at the computing device 202 and exhibits a threshold status (e.g., is not expired and/or is otherwise relevant to certain contextual data). When the tree data structure 210 is available in cache and exhibits the threshold status, the assistant application and/or another application can generate service suggestions 212 for rendering at a display interface 204 of the computing device 202.

However, when the tree data structure has not been generated by the automated assistant and/or exhibits an expired status, the assistant application can determine whether the tree data structure 210 is otherwise available from another application and/or from a remote device. When another version of the tree data structure 210 is determined to be available, the assistant application can process the user input 208 and/or the version of the tree data structure to generate the services suggestions 212. Based on this processing, the assistant application can cause a list of selectable deep links 214 for the application 216 to be generated and rendered at the display interface 204. For example, the list of selectable deep links 214 can include a GUI element indicating that selecting the GUI element will cause the application 216 to launch to "Control music volume," "Control my bedroom lights," and/or "Control security messages." In some implementations, a selectable deep link can be rendered with information (e.g., text, graphics, etc.) that indicates a status of a particular operation and/or setting to be controlled via the deep link. For example, the GUI for "Control my bedroom lights" can provide an indication of the status of smart lights (e.g., "Off"), and the GUI for "Control music volume" can be provided with an indication of the status for music volume (e.g., "7"). When the user selects a particular application deep link of the list of selectable deep links 214, training data can be generated and the assistant application can utilize this training data to update the tree data structure 210. In this way, more relevant application service suggestions can be provided to the user over time, thereby mitigating an amount of time spends navigating between interfaces of an application to arrive at a control interface for controlling any suggested service. This can preserve resources at the computing device 102, which can consume significant power and processing resources when facilitating navigation between application interfaces (compared to launching an application and going directly to the application interface that is most desirable to the user).

FIG. 3 illustrates a system 300 for providing suggestions for application services and/or functions in response to a search inquiry that is processed using one or more available data tree structures. For example, the automated assistant 304 can operate as part of an assistant application that is provided at one or more computing devices, such as a computing device 302 and/or a server device. A user can interact with the automated assistant 304 via assistant interface(s) 320, which can be a microphone, a camera, a touch screen display, a user interface, and/or any other apparatus capable of providing an interface between a user and an application. For instance, a user can initialize the automated assistant 304 by providing a verbal, textual, and/or a graphical input to an assistant interface 320 to cause the automated assistant 304 to initialize one or more actions (e.g., provide data, control a peripheral device, access an agent, generate an input and/or an output, etc.). Alternatively, the automated assistant 304 can be initialized based on processing of contextual data 336 using one or more trained machine learning models. The contextual data 336 can characterize one or more features of an environment in which the automated assistant 304 is accessible, and/or one or more features of a user that is predicted to be intending to interact with the automated assistant 304. The computing device 302 can include a display device, which can be a display panel that includes a touch interface for receiving touch inputs and/or gestures for allowing a user to control applications 334 of the computing device 302 via the touch interface. In some implementations, the computing device 302 can lack a display device, thereby providing an audible user interface output, without providing a graphical user interface output.

Furthermore, the computing device 302 can provide a user interface, such as a microphone, for receiving spoken natural language inputs from a user. In some implementations, the computing device 302 can include a touch interface and can be void of a camera, but can optionally include one or more other sensors.

The computing device 302 and/or other third-party client devices can be in communication with a server device over a network, such as the internet. Additionally, the computing device 302 and any other computing devices can be in communication with each other over a local area network (LAN), such as a Wi-Fi network. The computing device 302 can offload computational tasks to the server device in order to conserve computational resources at the computing device 302. For instance, the server device can host the automated assistant 304, and/or computing device 302 can transmit inputs received at one or more assistant interfaces 320 to the server device. However, in some implementations, the automated assistant 304 can be hosted at the computing device 302, and various processes that can be associated with automated assistant operations can be performed at the computing device 302.

In various implementations, all or less than all aspects of the automated assistant 304 can be implemented on the computing device 302. In some of those implementations, aspects of the automated assistant 304 are implemented via the computing device 302 and can interface with a server device, which can implement other aspects of the automated assistant 304. The server device can optionally serve a plurality of users and their associated assistant applications via multiple threads. In implementations where all or less than all aspects of the automated assistant 304 are implemented via computing device 302, the automated assistant 304 can be an application that is separate from an operating system of the computing device 302 (e.g., installed "on top" of the operating system)—or can alternatively be implemented directly by the operating system of the computing device 302 (e.g., considered an application of, but integral with, the operating system).

In some implementations, the automated assistant 304 can include an input processing engine 306, which can employ multiple different modules for processing inputs and/or outputs for the computing device 302 and/or a server device. For instance, the input processing engine 306 can include a speech processing engine 308, which can process audio data received at an assistant interface 320 to identify the text embodied in the audio data. The audio data can be transmitted from, for example, the computing device 302 to the server device in order to preserve computational resources at the computing device 302. Additionally, or alternatively, the audio data can be exclusively processed at the computing device 302.

The process for converting the audio data to text can include a speech recognition algorithm, which can employ neural networks, and/or statistical models for identifying groups of audio data corresponding to words or phrases. The text converted from the audio data can be parsed by a data parsing engine 310 and made available to the automated assistant 304 as textual data that can be used to generate and/or identify command phrase(s), intent(s), action(s), slot value(s), and/or any other content specified by the user. In some implementations, output data provided by the data parsing engine 310 can be provided to a parameter engine 312 to determine whether the user provided an input that corresponds to a particular intent, action, and/or routine capable of being performed by the automated assistant 304 and/or an application or agent that is capable of being accessed via the automated assistant 304. For example, assistant data 338 can be stored at the server device and/or the computing device 302, and can include data that defines one or more actions capable of being performed by the automated assistant 304, as well as parameters necessary to perform the actions. The parameter engine 312 can generate one or more parameters for an intent, action, and/or slot value, and provide the one or more parameters to an output generating engine 314. The output generating engine 314 can use the one or more parameters to communicate with an assistant interface 320 for providing an output to a user, and/or communicate with one or more applications 334 for providing an output to one or more applications 334.

In some implementations, the automated assistant 304 can be an application that can be installed "on-top of" an operating system of the computing device 302 and/or can itself form part of (or the entirety of) the operating system of the computing device 302. The automated assistant application includes, and/or has access to, on-device speech recognition, on-device natural language understanding, and on-device fulfillment. For example, on-device speech recognition can be performed using an on-device speech recognition module that processes audio data (detected by the microphone(s)) using an end-to-end speech recognition machine learning model stored locally at the computing device 302. The on-device speech recognition generates recognized text for a spoken utterance (if any) present in the audio data. Also, for example, on-device natural language understanding (NLU) can be performed using an on-device NLU module that processes recognized text, generated using the on-device speech recognition, and optionally contextual data, to generate NLU data.

NLU data can include intent(s) that correspond to the spoken utterance and optionally parameter(s) (e.g., slot values) for the intent(s). On-device fulfillment can be performed using an on-device fulfillment module that utilizes the NLU data (from the on-device NLU), and optionally other local data, to determine action(s) to take to resolve the intent(s) of the spoken utterance (and optionally the parameter(s) for the intent). This can include determining local and/or remote responses (e.g., answers) to the spoken utterance, interaction(s) with locally installed application(s) to perform based on the spoken utterance, command(s) to transmit to internet-of-things (IoT) device(s) (directly or via corresponding remote system(s)) based on the spoken utterance, and/or other resolution action(s) to perform based on the spoken utterance. The on-device fulfillment can then initiate local and/or remote performance/execution of the determined action(s) to resolve the spoken utterance.

In various implementations, remote speech processing, remote NLU, and/or remote fulfillment can at least selectively be utilized. For example, recognized text can at least selectively be transmitted to remote automated assistant component(s) for remote NLU and/or remote fulfillment. For instance, the recognized text can optionally be transmitted for remote performance in parallel with on-device performance, or responsive to failure of on-device NLU and/or on-device fulfillment. However, on-device speech processing, on-device NLU, on-device fulfillment, and/or on-device execution can be prioritized at least due to the latency reductions they provide when resolving a spoken utterance (due to no client-server roundtrip(s) being needed to resolve the spoken utterance). Further, on-device functionality can be the only functionality that is available in situations with no or limited network connectivity.

In some implementations, the computing device 302 can include one or more applications 334 which can be provided by a third-party entity that is different from an entity that provided the computing device 302 and/or the automated assistant 304. An application state engine of the automated assistant 304 and/or the computing device 302 can access application data 330 to determine one or more actions capable of being performed by one or more applications 334, as well as a state of each application of the one or more applications 334 and/or a state of a respective device that is associated with the computing device 302. A device state engine of the automated assistant 304 and/or the computing device 302 can access device data 332 to determine one or more actions capable of being performed by the computing device 302 and/or one or more devices that are associated with the computing device 302. Furthermore, the application data 330 and/or any other data (e.g., device data 332) can be accessed by the automated assistant 304 to generate contextual data 336, which can characterize a context in which a particular application 334 and/or device is executing, and/or a context in which a particular user is accessing the computing device 302, accessing an application 334, and/or any other device or module.

While one or more applications 334 are executing at the computing device 302, the device data 332 can characterize a current operating state of each application 334 executing at the computing device 302. Furthermore, the application data 330 can characterize one or more features of an executing application 334, such as content of one or more graphical user interfaces being rendered at the direction of one or more applications 334. Alternatively, or additionally, the application data 330 can characterize an action schema, which can be updated by a respective application and/or by the automated assistant 304, based on a current operating status of the respective application. Alternatively, or additionally, one or more action schemas for one or more applications 334 can remain static, but can be accessed by the application state engine in order to determine a suitable action to initialize via the automated assistant 304.

The computing device 302 can further include an assistant invocation engine 322 that can use one or more trained machine learning models to process application data 330, device data 332, contextual data 336, and/or any other data that is accessible to the computing device 302. The assistant invocation engine 322 can process this data in order to determine whether or not to wait for a user to explicitly speak an invocation phrase to invoke the automated assistant 304 and/or present an application search interface, or consider the data to be indicative of an intent by the user to invoke the automated assistant—in lieu of requiring the user to explicitly speak the invocation phrase. For example, the one or more trained machine learning models can be trained using instances of training data that are based on scenarios in which the user is in an environment where multiple devices and/or applications are exhibiting various operating states. The instances of training data can be generated in order to capture training data that characterizes contexts in which the user invokes the automated assistant and other contexts in which the user does not invoke the automated assistant to reach suggestions for application services. When the one or more trained machine learning models are trained according to these instances of training data, the assistant invocation engine 322 can cause the automated assistant 304 to detect, or limit detecting, spoken invocation phrases from a user based on features of a context and/or an environment. Additionally, or alternatively, the assistant invocation engine 322 can cause the automated assistant 304 to detect, or limit detecting for one or more assistant commands from a user based on features of a context and/or an environment. In some implementations, the assistant invocation engine 322 can be disabled or limited based on the computing device 302 detecting an assistant suppressing output from another computing device. In this way, when the computing device 302 is detecting an assistant suppressing output, the automated assistant 304 will not be invoked based on contextual data 336—which would otherwise cause the automated assistant 304 to be invoked if the assistant suppressing output was not being detected.

In some implementations, the system 300 can include a data structure generation engine 316 that can generate tree data structures for facilitating searching of application services for one or more one applications. The tree data structures can be cached at the computing device 302 for access by the automated assistant 304 and/or any other application 334 for reducing latency and improving relevancy of application service suggestions. The data structure generation engine 316 can operate multiple times within durations of time (e.g., days, hours, etc.) to provide updated relevant data structures that are based on most recent application data 330, device data 332, and/or contextual data 336. When a data structure is generated and cached, the data structure generation engine 316 can frequently determine whether the data structure has expired and/or whether additional data is available for generating an updated tree data structure. Alternatively, or additionally, when the data structure generation engine 316 determines that an updated tree data structure should be generated, one or more different sources of data can be solicited for updated information from which to generate an updated tree data structure.

For example, in some implementations, the system 300 can include a data structure request engine 318 that can generate requests for other sources (e.g., other applications, server, devices, etc.) to provide tree data structures for facilitating searching of application services. In some implementations, the data structure request engine 318 can solicit an updated tree data structure in response to determining that a tree data structure is not cached at the computing device 302 and/or has otherwise expired. In some implementations, the request can be provided to a remote server API that can be provided by an entity that also provides access to a particular client application 334. Alternatively, or additionally, the request can be provided to a remote server API that assists various applications with providing the tree data structure. Alternatively, or additionally, the request can be provided directly to an application 334 and/or to another memory device of the computing device 302 to determine whether an application tree data structure is already available.

In some implementations, the system 300 can include an operation status engine 326 that can determine whether an application service suggestion corresponds to a particular application operation that is exhibiting a particular status. When a particular application operation is exhibiting a particular status, the operation status engine 326 can generate content to be rendered with an application deep link for indicating a status of the operation to the user. In some implementations, the content that is generated can include selectable and/or modifiable GUI elements that, when selected, can control one or more operations and/or one or more services of one or more corresponding applications 334. In some implementations, the system 300 can include a training data engine 324 that can generate training data based on how a user interacts with any application service suggestions, deep links, and/or status content. In this way, tree data structures can be generated with more updated and relevant data, thereby allowing subsequent application service searches to be facilitated with more relevant tree data structures. This can mitigate an amount of time a user spends navigating between applications and/or application interfaces, thereby preserving memory and processing bandwidth that might otherwise be consumed on surfacing application interfaces the computing device 302.

Figure 4A:
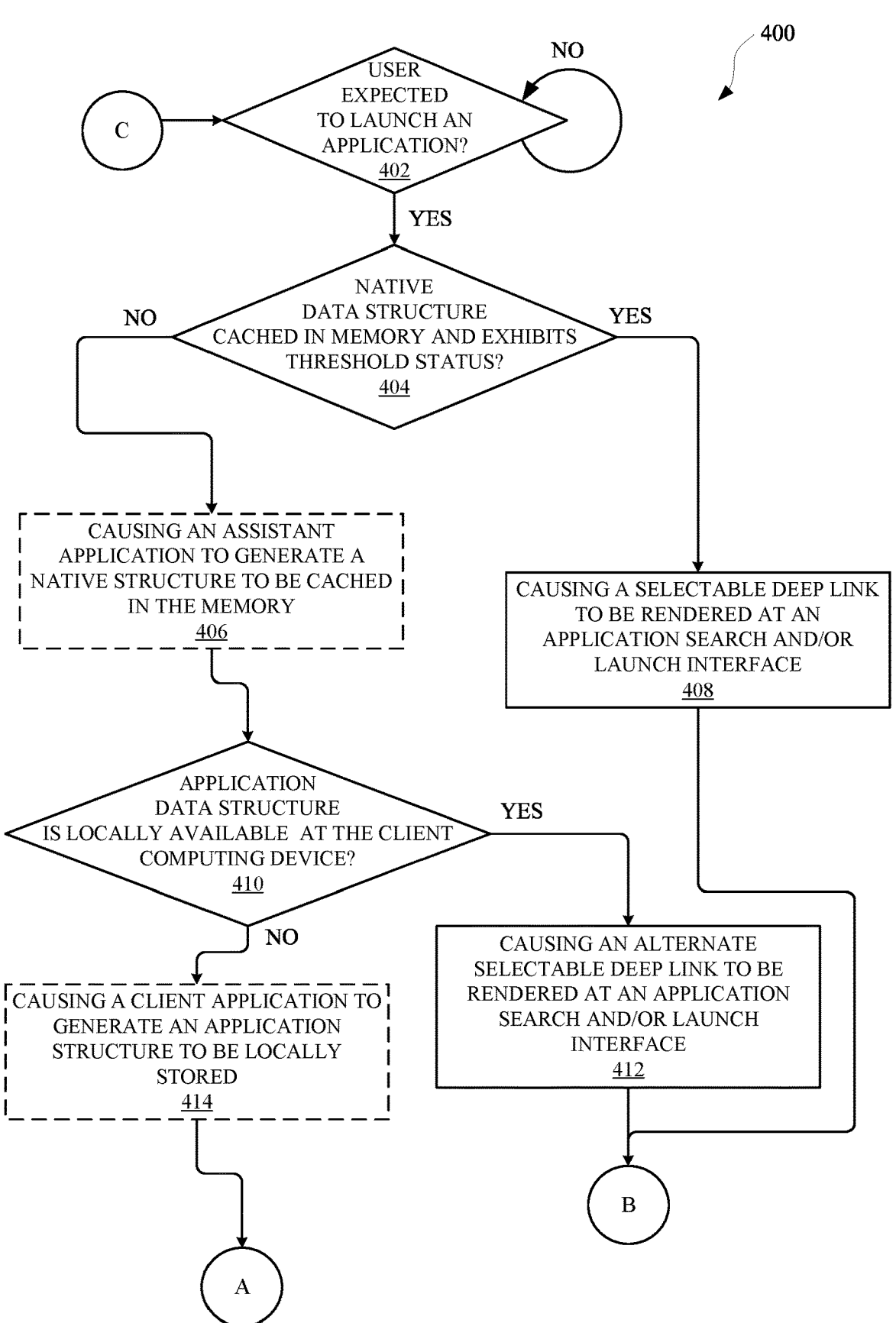
FIG. 4A and FIG. 4B illustrate methods for providing application service suggestions using one or more tree data structures sourced by different applications associated with a client computing device.
Figure 4B:
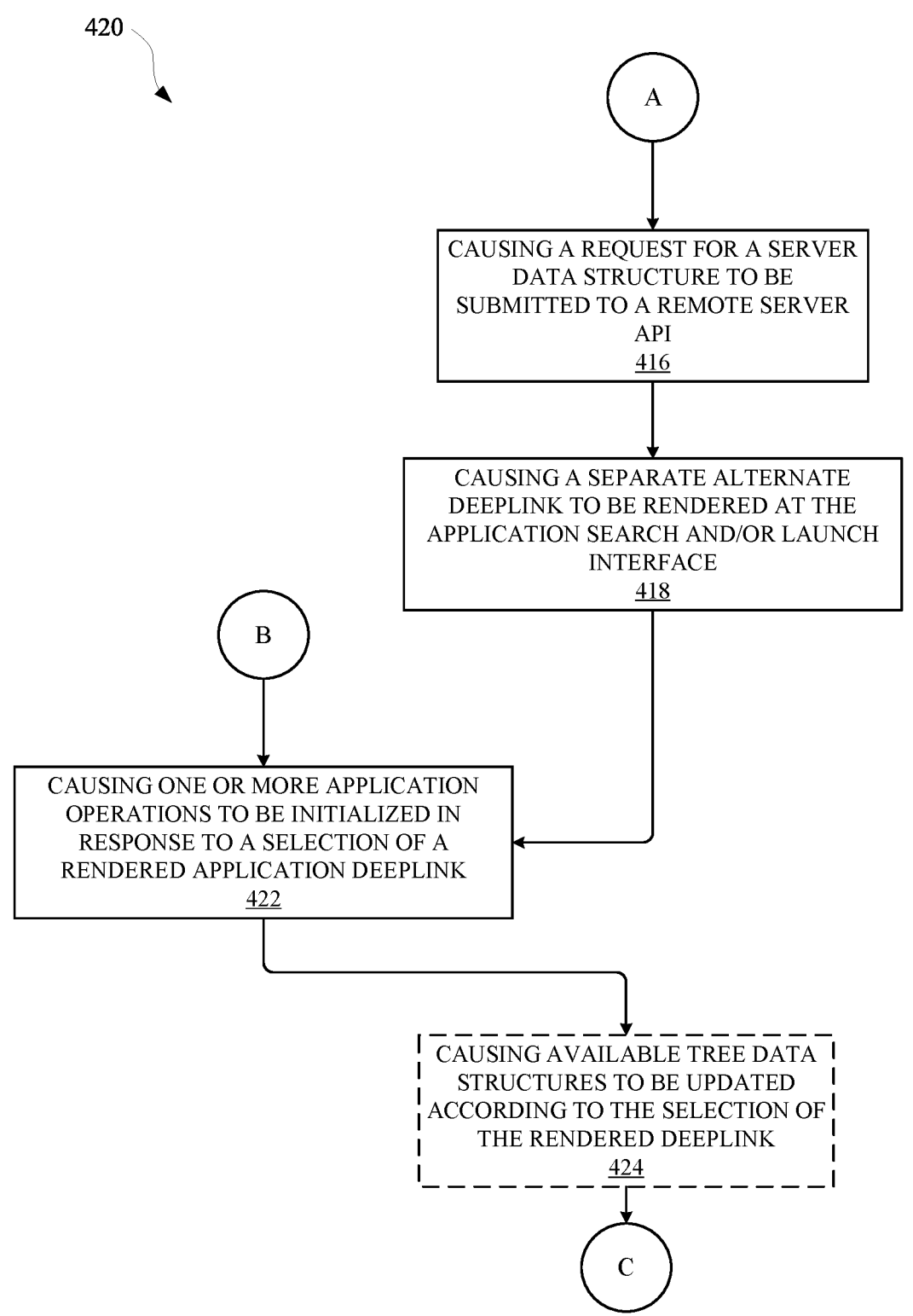

FIG. 4A and FIG. 4B illustrate a method 400 and a method 420 for providing application service suggestions using one or more tree data structures sourced by different applications associated with a client computing device. The method 400 can be performed by one or more applications, devices, and/or any other apparatus or module capable of interacting with client applications. The method 400 can include an operation 402 of determining whether a user is expected to launch and/or search for an application via their client computing device (e.g., cellular phone or tablet). For example, the user can view a home screen of the computing device and initiate an application search interface, in furtherance of receiving suggestions for application services and/or revealing a text input field for searching application services. Alternatively, or additionally, contextual data can be utilized with prior permission from the user to anticipate when the user will be requesting an application service search to be performed and, in response, the method 400 can proceed to the operation 404.

The operation 404 can include determining whether a native data structure is cached in memory at the computing device and/or exhibits a threshold status. The native data structure can be a tree data structure or other data structure for facilitating searching of data. In some implementations, the native data structure can be generated by the operating system of the computing device, an assistant application of the computing device, a first party application (first party relative to a party that produced the computing device and/or the operating system), and/or a third party application. Alternatively, or additionally, the native data structure can be generated by an application that also provides access to the application search interface, and/or an application that that was provided by an entity that produced the application search interface. In some implementations, the native data structure, and/or any data structure provided herein, can include nodes and terms associated with a particular client application, and/or multiple different client applications. In some implementations, data structures provided herein can also include nodes and terms associated with one or more client applications that may not be installed at the client application of the user. The nodes and terms associated with a data structure can be incorporated to facilitate searching of relevant application services, as opposed to generally facilitating searching for all available application services without regard to any context. Therefore, search terms and/or nodes can be weighted in favor of being the subject of a search query over others based on contextual data (e.g., time, location, historical usage data, and/or any other data that a user has made available with prior permission).

When the native data structure is determined to not be cached in memory and/or otherwise does not exhibit a threshold status (e.g., the cached native data structure was created more than a threshold duration of time ago), the method 400 can proceed from the operation 404 to an optional operation 406, or to an operation 410. Otherwise, when the native data structure is determined to be cached in memory (e.g., RAM) and optionally exhibits the threshold status, the method 400 can proceed from the operation 404 to an operation 408. The operation 408 can include causing a selectable deep link to be rendered at an application search and/or launch interface. The selectable deep link can be, for example, an application shortcut GUI that provides an indication of one or more particular operations that can be performed in response to selecting the application shortcut GUI. In other words, selecting the selectable deep link will cause the application to perform the one or more particular operations, beyond just merely launching the selected application. Alternatively, or additionally, when the application shortcut GUI refers to an application that is not installed at the client computing device, selecting the application shortcut GUI can cause the selected application to be installed at the client computing device, and/or a module of the selected application to be installed in furtherance of performing the indicated operations. The method 400 can then proceed from the operation 408, via continuation element "B", to an operation 422 provided in FIG. 4B.

The optional operation 406 can include causing an assistant application to generate a native structure to be cached in memory. The native data structure can be generated to improve fault tolerances by ensuring that a cached data structure is available the next time that the user accesses, or is expected to access, an application interface for receiving suggested for application services to launch. For example, the native data structure can be generated by an assistant application using any data available to the assistant application with prior permission from the user, such as, but not limited to, recently accessed application services, recently accessed client data, recently viewed web data, and/or any other data that can be relevant to providing suggestions for a user. The native data structure can then be optimized to reduce latency between when a user accesses an application search interface and receives suggestions for application services.

The method 400 can include an operation 410 of determining whether an application data structure(s) is locally available at the client computing device, such as cached in memory and/or stored in another memory device (e.g., ROM). The application data structure can be a tree structure or other data structure for facilitating searching of application services that are available via one or more applications that are accessible via the client computing device being accessed by the user. The application data structure can be generated according to a protocol determined by, or preferred by, the assistant application and/or operating system of the client computing device, and/or by a protocol or preference of the client application. When the application data structure is determined to be available in memory of the client computing device, the method 400 can proceed from the operation 410 to an operation 412. Otherwise, the method 400 can proceed from the operation 410 to an operation 414 for causing a client application to generate an application structure to be locally stored. For example, the operating system, assistant application, and/or another application can solicit one or more client applications to generate updated application tree data structures for storing locally and reducing latency when an application initializes a search for application services.

The operation 412 can include causing an alternate selectable deep link to be rendered at an application search and/or launch interface. The alternate selectable deep link can refer to an application service that is specified by the application data structure and/or is otherwise available by navigating between multiple application interfaces of one or more applications. Alternatively, or additionally, multiple different selectable deep links can be rendered at the application search interface based on the application data structure provided by an installed, or not installed, client application. In this way, the user can receive multiple different suggestions of applications services and/or operations that can be performed for assisting the user with streamlining any desired tasks. The deep links can be rendered at an application search interface in response to the user typing one or more characters at the search interface (e.g., "nearby foo . . . "), and the typed input can be processed in combination with any available data structure to determine the application deep links that would be most relevant to the estimated search goals of the user. When a deep link refers to a particular application operation, a status of the particular application operation can be retrieved and indicated using content, graphics, and/or any other information at the selectable deep link. For example, when the selectable deep link refers to an operation of opening a map application to view a route to a nearby restaurant, the selectable deep link can include an estimated time to travel to the nearby restaurant. Alternatively, or additionally, when the selectable deep link refers to controlling a setting of the map application (e.g., toggling dictation of directions), the selectable deep link can be presented with an indication of a current status of the setting (e.g., off) as text, graphics, or as other information that can be presented by a computing device.

The method 400 can proceed from the operation 414, via continuation element "A", to an operation 416 at the method 420 of FIG. 4B. The operation 416 can include causing a request for a server data structure to be submitted to a remote server API. The remote server API can refer to one or more different server APIs, and/or can be provided by an entity that provides one or more of the applications accessible via the client computing device. The request to the server API can cause the server API to generate a server data structure, and/or provide an available server data structure, for facilitating searching of application services at the client computing device. In some implementations, requesting the server data structure may exhibit more latency than retrieving a cached data structure. Therefore, to mitigate other instances of latency when suggesting applications services, the assistant application can surface one or more selectable deep links based on data structures that may not be (or may be) exhibiting a threshold status. These deep links can then be modified and/or replaced according to any updated data structures provided by the server, client application, and/or assistant application.

The method 420 can proceed from the operation 418 to an operation 422 of causing the one or more application operations to be initialized in response to a selection of a rendered application deep link. In other words, when a search query and/or input from the user has been processed for rendering suggested deep links based on available tree data structures, and a user selects a particular deep link, one or more application operations can be initialized. For example, an operation specified in a native data structure and/or application data structure can be initialized in response to the user selecting one or more particular deep links. In some implementations, in response to this selection, available tree data structures can optionally be updated according to the selection of one or more particular deep links and/or any other relevant contextual data, as indicated by operation 424. The method 420 can then proceed from the operation 424 or the operation 422, via continuation element "C", to the operation 402.

Figure 5:
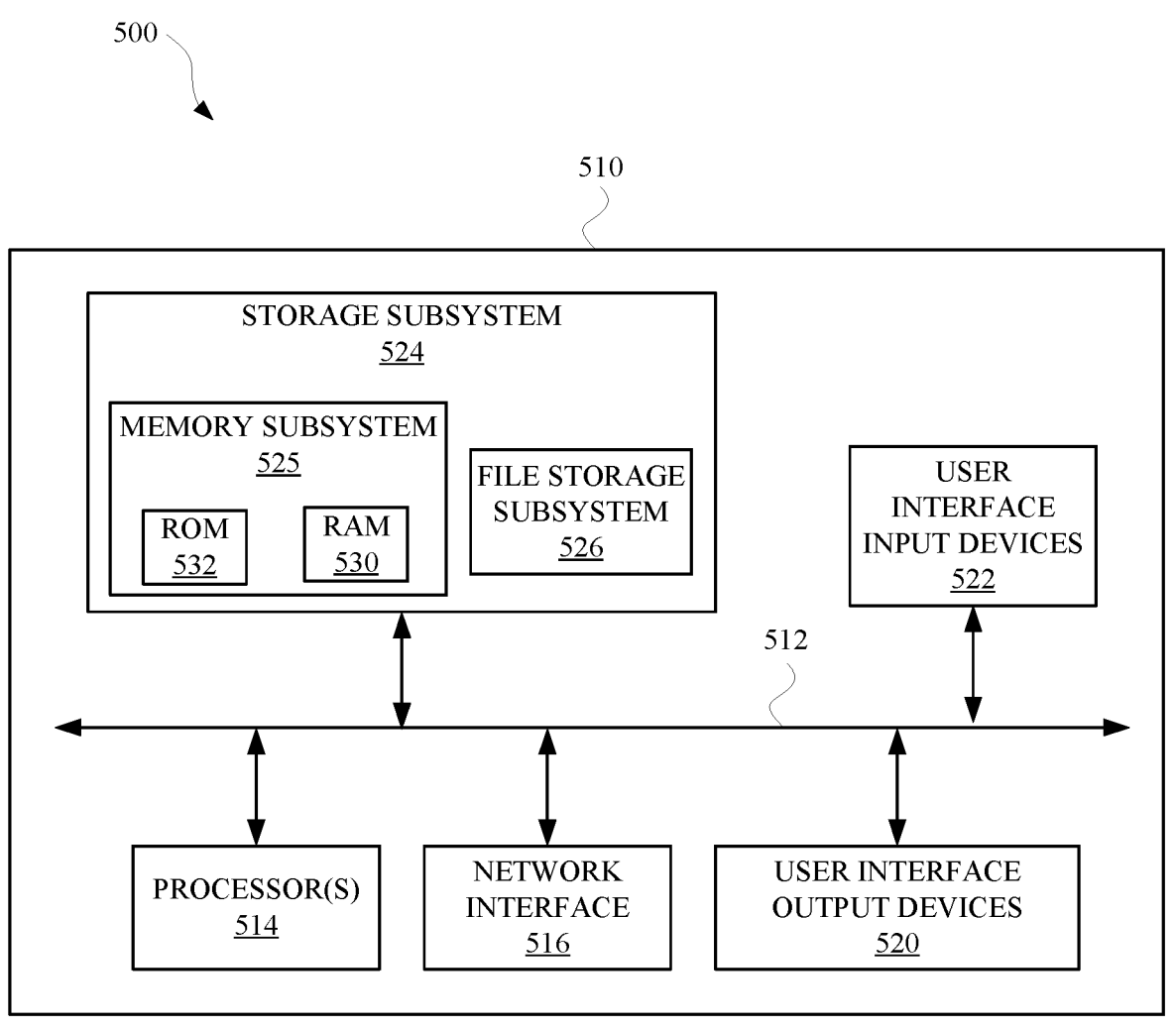
FIG. 5 illustrates a block diagram of an example computer system.

FIG. 5 is a block diagram 500 of an example computer system 510. Computer system 510 typically includes at least one processor 514 which communicates with a number of peripheral devices via bus subsystem 512. These peripheral devices may include a storage subsystem 524, including, for example, a memory 525 and a file storage subsystem 526, user interface output devices 520, user interface input devices 522, and a network interface subsystem 516. The input and output devices allow user interaction with computer system 510. Network interface subsystem 516 provides an interface to outside networks and is coupled to corresponding interface devices in other computer systems.

User interface input devices 522 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computer system 510 or onto a communication network.

User interface output devices 520 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computer system 510 to the user or to another machine or computer system.

Storage subsystem 524 stores programming and data constructs that provide the functionality of some or all of the modules described herein. For example, the storage subsystem 524 may include the logic to perform selected aspects of method 400 and method 420, and/or to implement one or more of system 300, computing device 102, computing device 202, automated assistant, and/or any other application, device, apparatus, and/or module discussed herein.

These software modules are generally executed by processor 514 alone or in combination with other processors. Memory 525 used in the storage subsystem 524 can include a number of memories including a main random access memory (RAM) 530 for storage of instructions and data during program execution and a read only memory (ROM) 532 in which fixed instructions are stored. A file storage subsystem 526 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 526 in the storage subsystem 524, or in other machines accessible by the processor(s) 514.

Bus subsystem 512 provides a mechanism for letting the various components and subsystems of computer system 510 communicate with each other as intended. Although bus subsystem 512 is shown schematically as a single bus, alternative implementations of the bus subsystem may use multiple busses.

Computer system 510 can be of varying types including a workstation, server, computing cluster, blade server, server farm, or any other data processing system or computing device. Due to the ever-changing nature of computers and networks, the description of computer system 510 depicted in FIG. 5 is intended only as a specific example for purposes of illustrating some implementations. Many other configurations of computer system 510 are possible having more or fewer components than the computer system depicted in FIG. 5.

In situations in which the systems described herein collect personal information about users (or as often referred to herein, "participants"), or may make use of personal information, the users may be provided with an opportunity to control whether programs or features collect user information (e.g., information about a user's social network, social actions or activities, profession, a user's preferences, or a user's current geographic location), or to control whether and/or how to receive content from the content server that may be more relevant to the user. Also, certain data may be treated in one or more ways before it is stored or used, so that personal identifiable information is removed. For example, a user's identity may be treated so that no personal identifiable information can be determined for the user, or a user's geographic location may be generalized where geographic location information is obtained (such as to a city, ZIP code, or state level), so that a particular geographic location of a user cannot be determined. Thus, the user may have control over how information is collected about the user and/or used.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

In some implementations, a method implemented by one or more processors is set forth as including operations such as determining that a user has launched, or is expected to launch, an application search interface at a computing device. The method can further include determining whether a native data structure for a client application is cached in a local memory of the computing device and whether the native data structure exhibits a particular status, wherein the native data structure is generated by an assistant application of the computing device and facilitates searching of services available via the client application. The method can further include, in response to determining that the native data structure is cached in the local memory of the computing device and the native data structure exhibits the particular status: causing a selectable deep link to be rendered with the application search interface, wherein the selectable deep link, in response to being selected, causes the client application to initialize a particular operation that is specified by the native data structure. The method can further include, in response to determining that the native data structure is not cached in the local memory or does not exhibit the particular status: determining that the application data structure is locally available at the client computing device, wherein the application data structure is generated by the client application and facilitates searching of the services available via the client application. The method can further include causing a particular selectable deep link to be rendered with the application search interface, wherein the particular selectable deep link, in response to being selected, causes the client application to initialize a separate operation that is specified by the application data structure.

In some implementations, the native data structure is a tree-based data structure that includes various strings that represent various services available via the client application. In some implementations, the local memory is a random-access memory (RAM) device and the application data structure is stored in another memory device that is separate from the RAM device. In some implementations, the method can further include determining that the user provided an input to a search field of the application search interface and the input specifies one or search characters; and, in response to determining that the native data structure is cached in the local memory of the computing device and the native data structure exhibits the particular status: determining, using the native data structure and the one or more search characters, that the particular operation is relevant to the one or more search characters. In some implementations, the method can further include determining that the user provided a separate input to a search field of the application search interface and the separate input specifies one or more other search characters; and in response to determining that the native data structure is not cached in the local memory: determining, using an instance of server data and the one or more other search characters, that the separate operation is relevant to the one or more other search characters.

In some implementations, the method can further include, in response to determining that the native data structure is cached in the local memory of the computing device and the native data structure exhibits the particular status: causing rendering of a graphical user interface (GUI) element that indicates a status of the particular operation specified by the native data structure. In some implementations, the method can further include, in response to determining that the native data structure is not cached in the local memory: causing rendering of a separate GUI element that indicates another status of the separate operation specified by an instance of server data. In some implementations, the native data structure is generated by the assistant application to facilitate searching of services available via multiple different applications that include the client application.

In other implementations, a method implemented by one or more processors is set forth as including operations such as determining that a user has launched, or is expected to launch, an application search interface at a computing device. The method can further include determining whether a native data structure for a client application is cached in a local memory of the computing device and whether the native data structure exhibits a particular status, wherein the native data structure is generated by an assistant application of the computing device and facilitates searching of services available via the client application. The method can further include, in response to determining that the native data structure is cached in the local memory of the computing device and the native data structure exhibits the particular status: causing a selectable deep link to be rendered with the application search interface, wherein the selectable deep link, in response to being selected, causes the client application to initialize a particular operation that is specified by the native data structure. The method can further include, in response to determining that the native data structure is not cached in the local memory or does not exhibit the particular status: requesting, from a remote application programming interface (API), a server data structure, wherein the server data structure facilitates searching of the services available via the client application and the server data structure is generated using a remote application service associated with the client application. The method can further include receiving, from the remote API, an instance of server data corresponding to the server data structure, and causing a separate selectable deep link to be rendered with the application search interface, wherein the separate selectable deep link, in response to being selected, causes the client application to initialize a separate operation that is specified by the instance of the server data.

In some implementations, the method can further include determining whether an application data structure is locally available at the client computing device, wherein the application data structure is generated by the client application and facilitates searching of the services available via the client application; and in response to determining that the application data structure is locally available at the client computing device: causing an alternate selectable deep link to be rendered with the application search interface, wherein the alternate selectable deep link, in response to being selected, causes the client application to initialize an alternate particular operation that is specified by the application data structure.

In some implementations, the native data structure is a tree-based data structure that includes various strings that represent various services available via the client application. In some implementations, the local memory is a random-access memory (RAM) device and the application data structure is stored in another memory device that is separate from the RAM device. In some implementations, the method can further include determining that the user provided an input to a search field of the application search interface and the input specifies one or more search characters; and in response to determining that the native data structure is cached in the local memory of the computing device and the native data structure exhibits the particular status: determining, using the native data structure and the one or more search characters, that the particular operation is relevant to the one or more search characters.

In some implementations, the method can further include determining that the user provided a separate input to a search field of the application search interface and the separate input specifies one or more other search characters; and in response to determining that the native data structure is not cached in the local memory: determining, using the instance of the server data and the one or more other search characters, that the separate operation is relevant to the one or more other search characters.

In some implementations, the method can further include, in response to determining that the native data structure is cached in the local memory of the computing device and the native data structure exhibits the particular status: causing rendering of a graphical user interface (GUI) element that indicates a status of the particular operation specified by the native data structure. In some implementations, the method can further include, in response to determining that the native data structure is not cached in the local memory: causing rendering of a separate GUI element that indicates another status of the separate operation specified by the instance of the server data. In some implementations, the native data structure is generated by the assistant application to facilitate searching of services available via multiple different applications that include the client application.

In yet other implementations, a method implemented by one or more processors is set forth as including operations such as determining that a user has selected an application shortcut via an interface of a computing device in furtherance of launching a client application. The method can further include determining whether a native data structure for the client application is cached in a local memory of the computing device and whether the native data structure exhibits a particular status, wherein the native data structure is generated by an assistant application of the computing device and facilitates searching of services available via the client application. The method can further include, in response to determining that the native data structure is cached in the local memory of the computing device and the native data structure exhibits the particular status: causing a list of selectable deep links to be rendered in association with the application shortcut at the interface, wherein a particular selectable deep link of the list of selectable deep links, in response to being selected, causes the client application to initialize a particular operation that is specified by the native data structure. The method can further include, in response to determining that the native data structure is not cached in the local memory: determining that an application data structure is locally available at the client computing device, wherein the application data structure is generated by the client application and facilitates searching of the services available via the client application. The method can further include causing an alternative list of selectable deep links to be rendered with the application search interface, wherein an alternative selectable deep link of the alternative list of selectable deep links, in response to being selected, causes the client application to initialize a separate operation that is specified by the application data structure.

In some implementations, the method can further include in response to determining that the native data structure is not cached in the local memory or does not exhibit the particular status: causing the assistant application to generate an updated native data structure that exhibits the particular status. In some implementations, the particular status indicates whether a time of creation for the native data structure satisfies an expiration threshold.

I claim:

1. A computing device, comprising:
local memory;
one or more processors operable to:
   determine that a user has launched, or is expected to launch, an application search interface;
   determine whether a native data structure for a client application is cached in the local memory and whether the native data structure exhibits a particular status,
      wherein the native data structure is generated by an assistant application of the computing device and facilitates searching of services available via the client application;
   in response to determining that the native data structure is cached in the local memory of the computing device and the native data structure exhibits the particular status:
      cause a selectable deep link to be rendered with the application search interface,
         wherein the selectable deep link, in response to being selected, causes the client application to initialize a particular operation that is specified by the native data structure;

in response to determining that the native data structure is not cached in the local memory or does not exhibit the particular status:

determine that an application data structure is locally available at the client computing device, wherein the application data structure is generated by the client application and facilitates searching of the services available via the client application; and cause a particular selectable deep link to be rendered with the application search interface, wherein the particular selectable deep link, in response to being selected, causes the client application to initialize a separate operation that is specified by the application data structure.

2. The computing device of claim 1, wherein the native data structure is a tree-based data structure that includes various strings that represent various services available via the client application.

3. The computing device of claim 2, wherein the local memory is a random-access memory (RAM) device and the application data structure is stored in another memory device that is separate from the RAM device.

4. The computing device of claim 1, wherein one or more of the processors are further operable to:

determine that the user provided an input to a search field of the application search interface and the input specifies one or more search characters; and in response to determining that the native data structure is cached in the local memory of the computing device and the native data structure exhibits the particular status:

determine, using the native data structure and the one or more search characters, that the particular operation is relevant to the one or more search characters.

5. The computing device of claim 1, wherein one or more of the processors are further operable to:

determine that the user provided a separate input to a search field of the application search interface and the separate input specifies one or more other search characters; and in response to determining that the native data structure is not cached in the local memory:

determine, using an instance of server data and the one or more other search characters, that the separate operation is relevant to the one or more other search characters.

6. The computing device of claim 1, wherein one or more of the processors are further operable to:

in response to determining that the native data structure is cached in the local memory of the computing device and the native data structure exhibits the particular status:

cause rendering of a graphical user interface (GUI) element that indicates a status of the particular operation specified by the native data structure.

7. The computing device of claim 6, wherein one or more of the processors are further operable to:

in response to determining that the native data structure is not cached in the local memory:

cause rendering of a separate GUI element that indicates another status of the separate operation specified by an instance of server data.

8. The computing device of claim 1, wherein the native data structure is generated by the assistant application to facilitate searching of services available via multiple different applications that include the client application.

9. A computing device, comprising:

local memory;

one or more processors operable to:

determine that a user has launched, or is expected to launch, an application search interface;

determine whether a native data structure for a client application is cached in the local memory and whether the native data structure exhibits a particular status, wherein the native data structure is generated by an assistant application of the computing device and facilitates searching of services available via the client application;

in response to determining that the native data structure is cached in the local memory of the computing device and the native data structure exhibits the particular status:

cause a selectable deep link to be rendered with the application search interface, wherein the selectable deep link, in response to being selected, causes the client application to initialize a particular operation that is specified by the native data structure;

in response to determining that the native data structure is not cached in the local memory or does not exhibit the particular status:

request, from a remote application programming interface (API), a server data structure, wherein the server data structure facilitates searching of the services available via the client application and the server data structure is generated using a remote application service associated with the client application, receive, from the remote API, an instance of server data corresponding to the server data structure, and cause a separate selectable deep link to be rendered with the application search interface, wherein the separate selectable deep link, in response to being selected, causes the client application to initialize a separate operation that is specified by the instance of the server data.

10. The computing device of claim 9, wherein one or more of the processors are further operable to:

determine whether an application data structure is locally available at the client computing device, wherein the application data structure is generated by the client application and facilitates searching of the services available via the client application; and in response to determining that the application data structure is locally available at the client computing device:

cause an alternate selectable deep link to be rendered with the application search interface, wherein the alternate selectable deep link, in response to being selected, causes the client application to initialize an alternate particular operation that is specified by the application data structure.

11. The computing device of claim 9, wherein the native data structure is a tree-based data structure that includes various strings that represent various services available via the client application.

12. The computing device of claim 10, wherein the local memory is a random-access memory (RAM) device and the application data structure is stored in another memory device that is separate from the RAM device.

13. The computing device of claim 9, wherein one or more of the processors are further operable to:

determine that the user provided an input to a search field of the application search interface and the input specifies one or more search characters; and in response to determining that the native data structure is cached in the local memory of the computing device and the native data structure exhibits the particular status:

determine, using the native data structure and the one or more search characters, that the particular operation is relevant to the one or more search characters.

14. The computing device of claim 9, wherein one or more of the processors are further operable to:

determine that the user provided a separate input to a search field of the application search interface and the separate input specifies one or more other search characters; and in response to determining that the native data structure is not cached in the local memory:

determine, using the instance of the server data and the one or more other search characters, that the separate operation is relevant to the one or more other search characters.

15. The computing device of claim 9, wherein one or more of the processors are further operable to:

in response to determining that the native data structure is cached in the local memory of the computing device and the native data structure exhibits the particular status:

cause rendering of a graphical user interface (GUI) element that indicates a status of the particular operation specified by the native data structure.

16. The computing device of claim 15, wherein one or more of the processors are further operable to:

in response to determining that the native data structure is not cached in the local memory:

cause rendering of a separate GUI element that indicates another status of the separate operation specified by the instance of the server data.

17. The computing device of claim 9, wherein the native data structure is generated by the assistant application to facilitate searching of services available via multiple different applications that include the client application.

18. A computing device, comprising:

local memory;

one or more processors operable to:

determine that a user has selected an application shortcut via an interface in furtherance of launching a client application;

determine whether a native data structure for the client application is cached in the local memory and whether the native data structure exhibits a particular status, wherein the native data structure is generated by an assistant application of the computing device and facilitates searching of services available via the client application;

in response to determining that the native data structure is cached in the local memory of the computing device and the native data structure exhibits the particular status:

cause a list of selectable deep links to be rendered in association with the application shortcut at the interface, wherein a particular selectable deep link of the list of selectable deep links, in response to being selected, causes the client application to initialize a particular operation that is specified by the native data structure;

in response to determining that the native data structure is not cached in the local memory:

determine that an application data structure is locally available at the client computing device, wherein the application data structure is generated by the client application and facilitates searching of the services available via the client application; and cause an alternative list of selectable deep links to be rendered with the interface, wherein an alternative selectable deep link of the alternative list of selectable deep links, in response to being selected, causes the client application to initialize a separate operation that is specified by the application data structure.

19. The computing device of claim 18, wherein one or more of the processors are further operable to:

in response to determining that the native data structure is not cached in the local memory or does not exhibit the particular status:

cause the assistant application to generate an updated native data structure that exhibits the particular status.

20. The computing device of claim 19, wherein the particular status indicates whether a time of creation for the native data structure satisfies an expiration threshold.

* * * * *